United States Patent [19]

Patterson et al.

[11] Patent Number: 5,436,015

[45] Date of Patent: * Jul. 25, 1995

[54] PROCESS FOR PREPARING NON-BROWNING, ENROBED PASTA

[75] Inventors: Patrick J. Patterson, Palatine; Hideo Tomomatsu, Crystal Lake; Arun K. Bansal, all of Barrington, Ill.

[73] Assignee: The Quaker Oats Company, Chicago, Ill.

[ * ] Notice: The portion of the term of this patent subsequent to Oct. 18, 2011 has been disclaimed.

[21] Appl. No.: 862,381

[22] Filed: Apr. 2, 1992

[51] Int. Cl.⁶ .......................... A23L 1/16; A23P 1/08
[52] U.S. Cl. ........................ 426/94; 426/291; 426/293; 426/302; 426/303; 426/309; 426/451; 426/557
[58] Field of Search .............. 426/309, 94, 291, 93, 426/293, 302, 303, 557, 451

[56] References Cited

U.S. PATENT DOCUMENTS

| | | | |
|---|---|---|---|
| 2,278,465 | 4/1942 | Musher | 99/83 |
| 2,475,133 | 7/1949 | Furter et al. | 99/11 |
| 2,811,447 | 10/1957 | Kamada et al. | 99/11 |
| 3,392,029 | 7/1968 | Nibler et al. | 99/83 |
| 3,652,299 | 3/1972 | Penton | 426/99 |
| 3,753,730 | 8/1973 | Donnarumma et al. | 426/309 |
| 3,879,566 | 4/1975 | Cox et al. | 426/309 |
| 4,767,636 | 8/1988 | Ramos et al. | 426/291 |
| 4,769,247 | 9/1988 | Rothenberg et al. | 426/291 |
| 5,089,284 | 2/1992 | Irvin et al. | 426/557 |

OTHER PUBLICATIONS

U.S. Ser. No. 845,887 filed Mar. 4, 1992 to Patterson et al.

Primary Examiner—Donald E. Czaja
Assistant Examiner—Mary S. Mims
Attorney, Agent, or Firm—Mart C. Matthews; Lars S. Johnson

[57] ABSTRACT

The present invention relates to a process for producing a flavored, enrobed pasta product, said process comprising: (a) applying a first aqueous composition to pasta; (b) contacting said pasta with an edible coating material to form a coated pasta; (c) applying a second aqueous composition in conjunction with intermixing of the coated pasta; and (d) drying said coated pasta. The present invention further comprises a flavored, enrobed pasta product prepared in accordance with the above-described process.

19 Claims, No Drawings

PROCESS FOR PREPARING NON-BROWNING, ENROBED PASTA

FIELD OF INVENTION

The present invention relates to a process for preparing a non-browning pasta product which is enrobed with edible coating materials such as cheese, including dried cheese, herbs, seasonings, spices and other flavoring agents. The present invention also relates to the product of said preparation process.

BACKGROUND OF INVENTION

Pasta products are popular with consumers. This popularity may be attributed to a number of features of these products, including their storage stability, ease of preparation, and nutritional properties. However, many feel that pasta products by themselves do not have a particularly appealing flavor, and as such they are served and consumed with sauces which add flavor to the pasta such as alfredo, marinara, tomato, tomato with meat, etc. However, these sauces do have drawbacks. For example, alfredo sauces can contain undesirable levels of fat. Additionally, sauces must be prepared separately from the pasta, and generally are not nearly as convenient to prepare as the pasta. Thus it would be desirable to prepare a pasta product which has a good flavor without the need to separately add inconvenient, and in some cases fat-containing, sauces.

The present invention obviates these problems in that it provides a method for preparing pasta coated with edible coating materials such as cheese, including dried cheese, herbs, spices, seasonings and other flavoring agents. These coated pasta products are convenient and desirable to consumers in that they may be enrobed with coating materials which form a sauce when combined with water, thereby obviating the need for adding a sauce. Alternatively, they may be enrobed with coating materials which do not form a sauce when prepared by the consumer. In the latter form the coated pasta products may be consumed by themselves, without added sauces, and still provide for a flavorful pasta product, or may be consumed in conjunction with a sauce if so desired.

When pasta is coated with such edible coating materials, it is desirable to have the coating materials distributed as uniformly as possible on the product, thereby providing a substantially uniform taste sensation to the consumer. This may be accomplished in a number of ways. For example, the flavoring agents can be pre-mixed in a pouch and included in the same package containing the pasta. The pasta can then be heated in boiling water, and the premixed, packaged flavoring agents can be added to the boiling water. The water will act as a vehicle to provide a substantially uniform distribution of the seasoning on the pasta substrate surface. A more convenient method would be that of the present invention wherein the flavoring agents are attached directly to the surface of the pasta during processing of the pasta. This obviates the need for the additional step of separately adding the flavoring agents to the cooking medium of the pasta.

However, there are problems associated with the production of pasta products having the flavoring agents attached directly to the pasta surface. One particular problem is that typical pastas have a moisture content of approximately 12-13 percent by weight, and these typical pastas tend to brown during storage when coated with such edible coating material, especially if the edible coating material comprises a proteinaceous material. Another problem is finding a method for attaching the edible coating material so only minimal separation from the pasta surface occurs during processing, packaging, shipping and handling. Still another problem is obtaining a substantially uniform distribution of the flavoring agents on the pasta surface. Furthermore, while there are methods of attaching flavoring agents to the surfaces of the pasta, such methods involve the use of fats and/or oils as an attachment aid. This use of fats and/or oils during processing is potentially undesirable for a number of reasons, including the greater safety risks of fats and oils as compared to water and the generally recognized unhealthful aspects of such fats and oils when included in products such as those prepared in accordance with the present invention.

The present invention obviates these problems in that it provides an improved method of preparing a pasta product enrobed with flavoring agents, including seasonings, herbs and spices, wherein the attachment of the flavoring agents to the product surface is facilitated by water instead of oil or fat, wherein the flavoring agents are attached substantially uniformly to pasta surface, wherein there is only minimal separation of the flavoring agents from the pasta surface, and wherein, in a preferred embodiment, browning of the coated pasta during storage is minimized.

Another advantage of this enrobed pasta product is that since the edible coating material is already enrobed directly onto the pasta surface, the consumer may prepare a serving or servings of any size. In contrast, in situations where pre-mixed, packaged flavor agents are combined with pasta by the consumer to prepare coated pasta, a finite number of servings and sizes must be prepared (e.g., one pre-mixed flavor package serves 6 and must all be made at one time).

BACKGROUND ART

The art discloses methods for coating rice and pasta with flavoring agents. A continuous process for preparing a non-segregating, free-flowing dried instant pasta and sauce dish in which spices are attached to the pasta surface is taught in U.S. Pat. No. 4,769,247, issued Sep. 6, 1988, to Rothenberg et al. In the Rothenberg method, instant pasta is first preheated and then conveyed to a rotating coating reel, wherein the pasta is tumbled. In the coating reel melted fat is applied to the heated tumbling pasta, after which the fat coated, heated pasta is contacted with dry sauce-producing ingredients. After being coated with the sauce-producing ingredients, a second and third coating of melted fat is applied to the pasta. The pasta is then cooled for packaging.

A method for allegedly uniformly applying coating materials to rice is disclosed in U.S. Pat. No. 3,392,029, issued Jul. 9, 1968, to Nibler et al. In the Nibler method, rice is coated by first forming a moistened surface of gelatinized rice on dry grains of rice having an equilibrium level of moisture or lower, said moistened surface being provided by adding water to the rice so as to increase the moisture level of the rice by from about 5 percent to about 20 percent of the weight of the rice, said increase in moisture level occurring primarily at the surface of the grains; mixing a substantially dry coating material with the moistened rice; and drying the rice.

U.S. Pat. No. 4,767,636, issued Aug. 30, 1988, to Ramos et al., discloses a method for preparing a non-segregating, free-flowing, dried instant rice and sauce dish in which spices are attached to the rice Surface. In the Ramos method, dried instant rice is conveyed to a rotating coating reel. At the coating reel, the rice is coated with, in order, oil, dry sauce-producing ingredients, and a second and third coating of oil.

However, none of these references teach or suggest a method for enrobing pasta with edible coating materials such as herbs, spices, seasonings, and other flavoring agents using an aqueous composition as an adhering agent in the particular sequence of process steps claimed herein. Furthermore, none of the references teach that browning of coated pasta upon storage can be minimized by one of the preferred embodiments claimed. Nor do any of these references teach that, in a preferred mode of the present invention, browning of the coated pasta during storage can be minimized when the pasta has a moisture content of less than or equal to about 8.0 percent by weight.

It is therefore an object of the present invention to provide a process for enrobing pasta with edible coating material using an aqueous composition as an adhering agent.

It is also an object of the present invention to provide a enrobed pasta product prepared in accordance with the method of the present invention.

In a preferred embodiment, it is also an object of the present invention to provide a process for enrobing pasta with edible coating material in such a manner that browning of the coated pasta upon storage is minimized, and to provide for a product of said process.

These and other objectives are accomplished by the invention described herein.

SUMMARY OF THE INVENTION

The present invention relates to a process for producing a flavored, enrobed pasta product, said process comprising: (a) applying a first aqueous composition to pasta; (b) contacting said pasta with an edible coating material to form a coated pasta; (c) applying a second aqueous composition in conjunction with intermixing of the coated pasta; and (d) drying said coated pasta.

The present invention further comprises a flavored, enrobed pasta product prepared in accordance with the above-described process.

DETAILED DESCRIPTION OF THE INVENTION

The present invention relates to a process for preparing an enrobed pasta product wherein pasta is coated with a first aqueous composition; contacted with an edible coating material to form a coated pasta; coated with a second aqueous composition in conjunction with intermixing of the coated pasta; and dried.

The pasta utilized in the present invention may either be obtained ready-formed from a supplier or may be formed by any method known to those skilled in the art. Examples of different types of pasta useful in the present invention include, but are not limited to: noodles, spaghetti, linguine, pasta shells, fettuccine, vermicelli, rosamaria, pasta elbows, angel hair, mostaccioli, rigatoni, spirals, tubes, bowtie, and lasagna, and mixtures thereof, with noodles being preferred.

The pasta may optionally be quick-cooking, which is typically accomplished by pretreating the pasta. By "quick-cooking" it is meant that the consumer can cook the final product of the present invention in a short period of time, typically by contacting it with heated water having a temperature of at least about 70° C., preferably about 95° C., for a period of time in the range of from about 5 to about 20, preferably from about 5 to about 10 minutes.

The pasta may be pretreated by any method known to those skilled in the art, and typically involves some degree of gelatinization of the pasta starch, particularly partial or total gelatinization of the surface starch of the pasta. Examples of pretreatment methods useful herein include, but are not limited to, steam- or water-cooking; hot-air cooking/browning; cooking during extrusion of pasta formation; and dry cooking, preferably by radiant heat.

In the process of the present invention, a first aqueous composition is contacted with the pasta. This first aqueous composition is at a temperature in the range of from about 5° C. to about 90° C., more preferably from about 15° C. to about 35° C., and may be contacted with the pasta by any method known to those skilled in the art. Examples of useful methods include, but are not limited to, spraying and immersion, with spraying being preferred. In a most preferred method, the first aqueous composition is sprayed onto the pasta in a drum rotating at a speed in the range of from about 2 RPM to about 50 RPM, preferably from about 3 RPM to about 30 RPM, more preferably from about 5 RPM to about 10 RPM. This provides for a more uniform coating of the first aqueous composition on the pasta.

The amount of first aqueous composition contacted with the pasta is in the range of from about 1% to about 30%, preferably from about 3% to about 12%, more preferably from about 6% to about 9% of the total weight of the pasta and first aqueous composition.

The first aqueous composition may be pure water or may be a mixture of water and other desirable, edible ingredients, although pure water is preferred. Examples of such ingredients useful herein include, but are not limited to, anti-oxidants, emulsifiers, fats, flavorings, spices and herbs. Anti-oxidants useful herein may be any anti-oxidant known to those skilled in the art. When selecting an anti-oxidant, consideration should be given to the effect of the anti-oxidant on the flavor profile of the final pasta product. Examples of useful anti-oxidants include, but are not limited to, BHA, BHT, TBHQ, ascorbyl palmitate, ascorbic acid, citric acid, rosemary extract, and tocopherols (vitamin E), with BHT being preferred.

Following application of the first aqueous composition, the pasta is contacted with an edible coating material. Edible coating materials useful herein can be any edible coatings, examples of which include, but are not limited to: proteinaceous materials such as nonfat milk, cultured milk, buttermilk, whey, sodium caseinate, cheese and dried cheese products such as Romano cheese, Parmesan cheese, and Cheddar cheese; herbs such as rosemary, sage, parsley, and thyme; spices such as onion, garlic and salt; seasonings such as soup mixes; other flavoring agents such as fruit flavors, spice extracts and flavors, and fats; and mixtures thereof; with blends of proteinaceous materials, herbs and spices being preferred. It is also preferred if the edible coatings are dehydrated.

The pasta and edible coating material may be contacted by any method known to those skilled in the art. Examples of useful methods include, but are not limited to, delivering the edible coating using a seasoning auger or a rotating disk, entraining the edible coating material in an air stream which is blown onto the pasta surface, mixing in a mechanical mixing device, mixing in a rotary drum, and mixing on a moving conveying belt surface by vibration, with the seasoning auger being preferred.

The pasta is preferably contacted with the edible coating material while the pasta is in a drum rotating at a speed in the range of from about 2 RPM to about 50 RPM, preferably from about 3 RPM to about 30 RPM, more preferably from about 5 RPM to about 10 RPM for a period of time in the range of from about 1 to about 10, preferably from about 2 to about 4 minutes. This provides for a more uniform distribution of coating material on the pasta surface.

The pasta is contacted with the edible coating material for a sufficient period of time to attach a sufficient amount of edible coating material to the pasta surface to impart the desired flavor characteristics. The precise amount of contacting time necessary will depend upon a number of variables, including the desired flavor profile of the final pasta product, the stickiness of the pasta surface, the method of contacting the pasta with the edible coating material, etc. The desired contact time will also be dependent upon the type of edible coating material being contacted with the pasta.

In a preferred embodiment, a blend of proteinaceous material, herbs and spices is contacted with the pasta using a seasoning auger while the pasta is rotated in a drum at a speed in the range of from about 2 RPM to about 50 RPM, preferably from about 3 RPM to about 30 RPM, more preferably from about 5 RPM to about 10 RPM. The pasta and the blend of proteinaceous material, herbs and spices are contacted in the drum for a period of time sufficient to produce a coated product comprising from about 1% to about 40%, preferably from about 6% to about 30%, most preferably from about 16% to about 22% by weight of the blend of proteinaceous material, herbs and spices, and from about 99% to about 60%, preferably from about 94% to about 70%, most preferably from about 84% to about 78% by weight of the pasta, based upon the total dry weight of the pasta and the blend of proteinaceous material, herbs and spices. This time period is typically from about 1 to about 10, preferably from about 2 to about 4 minutes.

A second aqueous composition is next contacted with the coated pasta in conjunction with intermixing the pasta. This second aqueous composition may be the same as the first aqueous composition, or it may be completely different. This second aqueous composition is preferably at a temperature in the range of from about 5° C. to about 90° C., more preferably from about 15° C. to about 35° C.

As with the first aqueous composition, the second aqueous composition may be contacted with the coated pasta by any method known to those skilled in the art. Examples of useful methods include, but are not limited to, spraying and immersion, with spraying being preferred. In a most preferred method, the second aqueous composition is sprayed onto the coated pasta in a drum rotating at a speed in the range of from about 2 RPM to about 50 RPM, preferably from about 3 RPM to about 30 RPM, more preferably from about 5 RPM to about 10 RPM. This provides for a more uniform coating of the second aqueous composition on the coated pasta.

The amount of second aqueous composition contacted with to the coated pasta is in the range of from about 1% to about 30%, preferably from about 3% to about 10%, more preferably from about 4% to about 7% of the total weight of the coated pasta and second aqueous composition.

As with the first aqueous composition, the second aqueous composition may be pure water or may be a mixture of water and other desirable, edible ingredients, such as those already described herein. In a preferred mode, the second aqueous composition comprises pure water.

The intermixing can be accomplished by any methods known to those skilled in the art and should be carried out for a sufficient length of time and with sufficient equipment to cause a "smearing" effect of the coating material on the pasta surface. By smearing it is meant that force from the pasta particles contacting each other during intermixing causes the edible coating material on the pasta surface to be spread in a thin layer across the pasta surface and forced to a minor degree into the surface structure of the pasta. This in turn allows for superior adhesion of the coating material to the pasta surface. One preferred example of a type of equipment useful for accomplishing the desired effect of intermixing is a rotating drum having its interior coated or lined with a non-sticking material, for example Teflon. The intermixing is typically carried out for a period of time in the range of from about 1 to about 10, preferably from about 1.5 to about 3.5 minutes.

After being coated with the second aqueous coating and prior to drying, the coated material may optionally be mixed, tumbled, or agitated by other means for a period of time in the range of from about 1 to about 3 minutes. A preferred mixing method is to rotate the coated material in a drum at a rotational speed of from about 2 RPM to about 50 RPM, preferably from about 3 RPM to about 30 RPM, more preferably from about 5 RPM to about 10 RPM.

Following the application of the second aqueous composition to the pasta, the coated pasta is dried to a moisture content in the range of from about 3% to about 13% preferably from about 3% to about 8% by weight, more preferably from about 5.5% to about 6.5% by weight.

The drying can be accomplished by any means known to those skilled in the art. Examples of drying methods useful in the present invention include, but are not limited to, forced-air dryers, air impingement dryers, microwave dryers, radio-frequency dryers, and direct radiant dryers, with forced-air convection dryers being preferred. In a typical drying operation, the coated pasta is subjected to a temperature ranging from about 40° C. to about 100° C., preferably from about 60° C. to about 80° C., for a period of time in the range of from about 10 to about 40, preferably from about 20 to about 30, more preferably from about 23 to about 27 minutes. To improve drying and energy efficiency, it is preferred that the coated pasta be spread on an extended surface, such as shallow pans or on a conveyor belt, during drying.

While not intending to be bound by theory, it is unexpected and surprising that pasta contained in the product of the process of the present invention could be coated with the degree of adherence provided by the process of the present invention. The application of the second aqueous composition in conjunction with intermixing provides a considerable improvement in coating adherence as compared to a process wherein the pasta is wetted, a coating is applied to the wetted pasta, and the coated pasta is then dried. It is also unexpected and surprising that the pasta can be coated in a substantially uniform manner by the process described in the present invention.

In a preferred embodiment of the process of the present invention, the final coated pasta product has a moisture content in the range of from about 3% to about 8%, preferably from about 5.5% to about 6.5% by weight. Most pasta products have a final moisture content of about 12% to about 13% by weight. It has been unexpectedly and surprisingly found that coated pasta products prepared by the process of the present invention at these higher moisture levels experience browning during storage, whereas coated products prepared by the process of the present invention having the lower, preferred moisture levels referred to above experience substantially no browning upon storage. This is especially true when proteinaceous coating materials are used.

The final moisture content can be achieved by any means known to those skilled in the art. For example, the pasta can be purchased or dried to the desired moisture levels before being introduced into the process. Alternatively, the pasta can be dried down to the desired moisture level during the final drying step of the process. It is preferred that the pasta be at the desired lower moisture level prior to introduction to the process. This is because it is more efficient and provides a better tasting product, since the attached coatings will not be subject to the potentially flavor degrading heat necessary to reduce the pasta moisture to the preferred levels. It should be clarified that if the pasta is at the desired moisture level prior to introduction to the process, then the last drying step is to remove the moisture added via the application of the first and second aqueous compositions during the process.

The process of the present invention may optionally include contacting the coated pasta with a second edible coating after the application of the second aqueous composition. This contacting of the pasta with a second edible coating is then followed by contacting the twice-coated pasta with a third aqueous composition, followed by the drying step already describe herein.

The second edible coating may be of a type as already described herein for the first edible coating, although the two need not be identical. For example, the first edible coating could comprise cheese while the second edible coating comprises a blend of herbs and spices. As with the first edible coating, the second edible coating may be contacted with the pasta by any method known to those skilled in the art, including the examples already described herein. The preferred method for contacting the coated pasta with the second edible coating is by a seasoning auger.

The second edible coating is contacted with the coated pasta for a sufficient period of time to attach a sufficient amount of second edible coating material to the pasta surface to impart the desired flavor characteristics. As with the first edible coating, the precise amount of contacting time necessary will depend upon a number of variables, including the desired flavor profile of the final pasta product, the stickiness of the pasta surface, the method of contacting the pasta with the second edible coating material, etc. The desired contact time will also be dependent upon the type of the first edible coating material and the type of second edible coating material being contacted with the pasta.

For example, if the first and second edible coatings are identical, then the necessary contact time will depend upon the ratio of first and second edible coatings. As an example, a preferred final coated pasta product comprises from about 10% to about 40%, preferably from about 15% to about 25% by weight of a blend of proteinaceous material, herbs and spices, and from about 90% to about 60%, preferably from about 85% to about 75% by weight of pasta, based upon the total dry weight of the pasta and blend of proteinaceous material, herbs and spices. In a preferred method of preparing this product, from about 40% to about 80%, preferably from about 50% to about 70% by weight of the total applied edible coating material is applied as a first edible coating and from about 60% to about 20%, preferably from about 50% to about 30% by weight of the total applied edible coating material is applied as a second edible coating. In this instance, the contact time of the second edible coating material with the coated pasta will be in the range of from about 1 to about 4, preferably from about 1 to about 2 minutes.

The third aqueous composition is contacted with the pasta in conjunction with intermixing the pasta and is preferably at a temperature in the range of from about 5° C. to about 90° C., more preferably from about 15° C. to about 35° C.

As with the first and second aqueous compositions, the third aqueous composition may be contacted with the coated pasta by any method known to those skilled in the art. Examples of useful methods include, but are not limited to, spraying and immersion, with spraying being preferred. In a most preferred method, the third aqueous composition is sprayed onto the coated pasta in a drum rotating at a speed in the range of from about 2 RPM to about 50 RPM, preferably from about 3 RPM to about 30 RPM, more preferably from about 5 RPM to about 10 RPM. This provides for a more uniform coating of the third aqueous composition on the coated pasta.

Also as with the first and second aqueous compositions, the third aqueous composition may be pure water or may be a mixture of water and other desirable, edible ingredients, such as those already described herein. In a preferred mode, the third aqueous composition has the same composition as the first and second aqueous compositions, as already described herein.

The amount of third aqueous composition contacted with the coated pasta is in the range of from about 1% to about 10%, preferably from about 2% to about 6%, more preferably from about 2% to about 4% of the total weight of the coated pasta and third aqueous composition.

A preferred process in accordance with the present invention comprises: (a) charging pasta into an enrober; (b) spraying a first aqueous composition onto said pasta in said enrober to form a moistened pasta; (c) applying an edible coating material on said moistened pasta using an auger, thereby forming a coated product; (d) spraying a second aqueous composition onto said coated product while said pasta is rotated in said enrober to form a double coated product; (e) discharging said coated product from said enrober; and (f) drying said coated product to form a final, coated pasta product; wherein said final, coated pasta product has a moisture content in the range of from about 5.5% to about 6.5% by weight.

The application of the first and second aqueous compositions and the drying process are carried out as already described herein. Furthermore, the edible coating material is the same as that already described herein.

The enrober used herein may be any enrobing device known to those skilled in the art. Examples of enrobing devices useful herein include, but are not limited to, flow-through coating drums, in/out coating drums, and perforated conveyor belts, with flow-through coating drums being preferred. A most preferred enrobing device comprises a Teflon-lined rotating drum which provides for intermixing of the pasta during the application of the first and second aqueous compositions and edible coating material. The enrober rotates at a speed in the range of from about 2 RPM to about 50 RPM, preferably from about 3 RPM to about 30 RPM, more preferably from about 5 RPM to about 10 RPM. The total retention time of the pasta in the enrober is that time necessary for sufficiently adhering a sufficient amount of edible coating material to the pasta surface to provide for a desired flavor profile, and is dependent upon the factors already described herein such as the type of edible coating material used, the desired flavor profile, etc. Typical total retention times range from about 1 to about 20, preferably from about 3 to about 10 minutes.

The edible coating material is applied to the moistened pasta via a seasoning auger, which in essence is a screw in a barrel. There are holes in the barrel bottom which the coating material falls through and onto the pasta. The amount of edible coating material applied to the moistened pasta will depend upon the composition of the edible coating, although said amount typically is in the range of from about 10% to about 40%, preferably from about 15% to about 25% by weight, based upon the dry weight of the pasta.

In a more preferred embodiment, a second edible coating material and a third aqueous composition are contacted with the coated pasta. This second edible composition is contacted with the pasta in the enrober immediately after the pasta is contacted with the second aqueous composition, with the third aqueous composition being contacted with the pasta following the application of the second edible coating. The coated pasta is then dried. The second edible coating and third aqueous composition utilized in this preferred embodiment of the present invention are, respectively, the same as the first edible coating and the first and second aqueous compositions already described herein, and are applied in the weight ratios already described herein. The total amount of edible coating material contacted with the moistened pasta in the first and second application steps is in the range of from about 1% to about 40% by weight, based upon the dry weight of the pasta and total applied edible coating material.

The present invention further comprises a pasta product coated with an edible coating material prepared by the process claimed herein.

The pasta and edible coating material utilized in the product of the process of the present invention are as already described herein. The product comprises from about 60% to about 99%, preferably from about 75% to about 93% by weight pasta; from about 1% to about 40%, preferably from about 7% to about 25% by weight edible coating material; and has a moisture content in the range of from about 3% to about 13%, preferably from about 3% to about 8%, more preferably from about 5.5% to about 6.5% by weight. The weight percentages of the pasta and edible coating material are based upon the total dry weight of the pasta and the edible coating material.

The present invention is further illustrated, but not limited by, the following examples.

EXAMPLES

EXAMPLE 1

Noodles which are 3/32 inch wide and 1.5 inch long and contain 0.75% by weight egg whites are used in this process. Four and two-tenths pounds per minute of the noodles is charged into a Teflon-lined, seven foot drum enrober. The noodles are charged into the rotating drum via a vibratory conveyer. The enrober rotates at a speed of 8 RPM and the noodles move through the enrober at a linear speed of 1 foot per minute. Water is sprayed over the tumbling noodles through 2 spray nozzles symmetrically arranged over an 18 inch length of product bed. The water is sprayed at a rate of 0.36 pounds per minute. A space of 6 inches is allowed after the water spray to prevent overlap of the water and seasoning mix. A dry seasoning mix containing dried buttermilk, Parmesan cheese, Romano cheese, soybean oil, salt, onions, nonfat dried milk, parsley, cheddar cheese, sodium caseinate, spices, corn syrup and monoglycerides, is sprinkled onto the wetted pasta using an auger feeder. The seasoning mix is applied to the wetted pasta at a rate of 0.83 pounds per minute and is applied over a 24 inch length of product bed. A second space of 6 inches is allowed before a second water spray is applied to the noodles. The second water spray is applied to the noodles through 2 spray nozzles over a 2 foot length of product bed. The second water spray is applied to the coated noodles in conjunction with tumbling of the noodles in the rotating drum. This allows the seasoning mix to be smeared onto the noodle surface, which in turn provides for greater adhesion of the seasoning mix to the noodle surface. The coated product is dried for 25 minutes in a continuous forced air dryer at a temperature of 160° F. The moisture content of the dried product is 6% by weight. Any clumps in the dried product are separated by a rotating pin mechanism.

EXAMPLE 2

Noodles containing 0.75% by weight egg whites are produced and dried to a 6.5% by weight moisture level. The noodles are 0.25 inch wide, 1.25 inch long and 0.029 inch thick, and are slightly twisted. Nine thousand grams of these noodles are loaded into a Teflon-lined batch rotating drum tumbler. The useful length of the drum is 4 feet. The longitudinal baffles in the drum provide the mixing action by picking up the product and dropping it back inside the enrober. One end of the drum is closed up by an end-cap. A pneumatic-assist water spray system is set up inside the enrober. This consists of three pneumatic nozzles spaced 15 inches from each other. The enrober is rotated at 7 RPM. The noodles are coated in 5 steps. First 400 grams of water is sprayed onto the noodles through supplying nozzles in the drum. Next 1476 grams of dry seasoning mix consisting of Parmesan and Romano cheese, flavors, herbs, milk products and spices is applied to the wetted noodles via a seasoning auger. Four hundred grams of water are sprayed onto the seasoning coated noodles via the spry nozzles used to apply the first application of water. This water is sprayed on the pasta while the drum is rotating to allow for smearing of the seasoning mix onto the noodle surface. Nine hundred additional grams of the seasoning mix is applied to the noodles following the second water application. Two hundred and fifty grams of water is finally applied to the noodles in conjunction with rotation of the noodles in the drum.

At the end of the enrobing, the end cap of the drum is removed and the coated product is discharged onto a dryer tray. The tray holding the wet enrobed noodles is placed in a forced-air, through circulation dryer. The noodles are dried for 25 minutes at 160° F. The final moisture content of the enrobed product is 6.5% by weight.

EXAMPLE 3

Shell shaped macaroni noodles are produced in a pasta manufacturing system and dried down to 6% by weight moisture. Two thousand five hundred pounds per hour of these shells are charged into a Teflon-lined rotating enrober having a length of 15 feet and a diameter of 44 inches. The enrober rotates at a speed of 8 RPM and the shells travel through the enrober at a linear speed of 1.5 feet per minute. Two hundred forty pounds per hour of water is sprayed onto the shells through 5 spray nozzles arranged symmetrically over a 40 inch length of the product bed. Fifty pounds per hour of a seasoning mix consisting of cheddar cheese, herbs and spices is applied to the wetted shells over a 48 inch length of product bed via a seasoning auger. One hundred sixty pounds per hour of water is sprayed onto the seasoning-coated shells via 6 nozzles over a 50 inch length of product bed. After the second water spray the coated shells are tumbled for an additional 12 inches of enrober length. The total residence time in the drum is approximately 10 minutes. After leaving the enrober the coated, wet product is dried on a two-pass, through-circulation dryer for 30 minutes at a temperature of 165° F. The final moisture content of the dried shells is 6.5% by weight.

What is claimed is:

1. A process for preparing a flavored, enrobed pasta product, said process comprising: (a) applying a first aqueous composition to pasta; (b) contacting said pasta with an edible coating material to form a coated pasta; (c) applying a second aqueous composition in conjunction with intermixing of the coated pasta; and (d) drying said coated pasta; wherein the final coated pasta product has a moisture content in the range of from about 3% to about 8% by weight.

2. A process according to claim 1 wherein the final coated pasta product has a moisture content in the range of from about 5.5% to about 6.5% by weight.

3. A process according to claim 1 wherein the edible coating material is selected from the group consisting of proteinaceous material, herbs, spices, seasonings, other flavoring agents, and mixtures thereof.

4. A process according to claim 2 wherein the edible coating material is a blend of proteinaceous material, herbs and spices.

5. A process according to claim 3 wherein the edible coating material is contacted with the pasta for a period of time sufficient to produce a coated pasta product which comprises from about 1% to about 40% by weight of the blend of proteinaceous material, herbs and spices and from about 60% to about 99% by weight pasta, based upon the total dry weight of the pasta and the blend of proteinaceous material, herbs and spices.

6. A process according to claim 5 wherein the blend of proteinaceous material, herbs and spices is contacted with the pasta for a period of time in the range of from about 1 to about 10 minutes.

7. A process according to claim 6 wherein the amount of first and second aqueous compositions contacted with the coated pasta are each in the range of from about 1% to about 30% by weight of the coated pasta and, respectively, first and second aqueous compositions.

8. A process according to claim 7, wherein the coated pasta is dried at a temperature in the range of from about 40° C. to about 100° C. for a period of time in the range of from about 10 to about 40 minutes.

9. A process for preparing a flavored, enrobed pasta product, said process comprising: (a) charging pasta into an enrober; (b) spraying a first aqueous composition onto said pasta in said enrober to form a moistened pasta; (c) applying an edible coating material on said moistened pasta using an auger, thereby forming a coated product; (d) spraying a second aqueous composition onto said coated product while said pasta is rotated in said enrober to form a double coated product; (e) discharging said coated product from said enrober; and (f) drying said coated product to form a final, coated pasta product; wherein said final, coated pasta product has a moisture content in the range of from about 5.5% to about 6.5% by weight.

10. A process according to claim 9 wherein following the application of the second aqueous composition, the pasta is contacted first with a second edible coating material and then with a third aqueous composition, wherein said third aqueous composition is contacted with the pasta in conjunction with intermixing of the pasta.

11. A process according to claim 10 wherein the enrober comprises a rotating drum rotating at a speed in the range of from about 2 RPM to about 50 RPM.

12. A process according to claim 11 wherein the total retention time of the pasta in the enrober is in the range of from about 1 to about 20 minutes.

13. A process according to claim 12 wherein the amount of first and second aqueous compositions contacted with the coated pasta are each in the range of from about 1% to about 30% by weight of the coated pasta and, respectively, first and second aqueous compositions.

14. A process according to claim 13 wherein the first and second edible coating material is a blend of proteinaceous material, herbs and spices.

15. A process according to claim 14 wherein the total amount of edible coating material contacted with the moistened pasta is in the range of from about 1% to about 40% by weight, based upon the dry weight of the pasta and total applied edible coating material.

16. A flavored, enrobed pasta product prepared by: (a) applying a first aqueous composition to pasta; (b) contacting said pasta with an edible coating material to form a coated pasta; (c) applying a second aqueous composition in conjunction with intermixing of the coated pasta; and (d) drying said coated pasta; wherein the final coated pasta product has a moisture content in the range of from about 3% to about 8% by weight.

17. A product according to claim 16 comprising from about 60% to about 99% by weight pasta and from about 1% to about 40% by weight edible coating material, based upon the total dry weight of the pasta and the edible coating material.

18. A product according to claim 17 wherein the edible coating material is selected from the group consisting of proteinaceous material, herbs, spices, seasonings, other flavoring agents, and mixtures thereof.

19. A product according to claim 18 wherein the edible coating material is a blend of proteinaceous material, herbs and spices.

* * * * *